US006556916B2

(12) United States Patent
Waite et al.

(10) Patent No.: US 6,556,916 B2
(45) Date of Patent: Apr. 29, 2003

(54) SYSTEM AND METHOD FOR IDENTIFICATION OF TRAFFIC LANE POSITIONS

(75) Inventors: Jonathan L. Waite, Orem, UT (US); Thomas William Karlinsey, Orem, UT (US); David V. Arnold, Provo, UT (US)

(73) Assignee: Wavetronix LLC, Provo, UT (US)

( * ) Notice: Subject to any disclaimer, the term of this patent is extended or adjusted under 35 U.S.C. 154(b) by 0 days.

(21) Appl. No.: 09/966,146

(22) Filed: Sep. 27, 2001

(65) Prior Publication Data

US 2003/0060969 A1 Mar. 27, 2003

(51) Int. Cl.$^{7}$ .................................................. G06F 7/00
(52) U.S. Cl. ........................................ 701/117; 340/933
(58) Field of Search ................................. 701/117, 118, 701/119; 340/905, 907, 928, 933, 935

(56) References Cited

U.S. PATENT DOCUMENTS

| | | | | |
|---|---|---|---|---|
| 5,448,484 | A | 9/1995 | Bullock et al. | |
| 5,694,134 | A | 12/1997 | Barnes | 343/700 |
| 5,714,965 | A | 2/1998 | Taguchi | 343/866 |
| 5,748,153 | A | 5/1998 | McKinzie, III et al. | 343/767 |
| 5,793,491 | A | 8/1998 | Wangler et al. | 356/376 |
| 5,798,983 | A | 8/1998 | Kuhn et al. | 367/135 |
| 5,949,383 | A | 9/1999 | Hayes et al. | 343/795 |
| 6,081,226 | A | 6/2000 | Caldwell et al. | 342/200 |
| 6,177,885 | B1 | 1/2001 | Weil et al. | 340/933 |
| 6,198,437 | B1 | 3/2001 | Watson et al. | 343/700 |
| 6,204,778 | B1 | 3/2001 | Bergan et al. | 340/936 |

OTHER PUBLICATIONS

Vehicle Detector Workshop, TexITE, Jun. 2000, pp. 5–39.

R.L. Smith et al. "Development of a Low Cost, FM/CW Transmitter for Remote Sensing," IGARSS 2000 (Hawaii).

J.C. Beard et al. "6GHz Range Finder Using Pulse Compression," IGARSS 2000 (Hawaii).

J.L. Waite et al. "Interferometric Radar Principles in Track Hazard Detection to Improve Safety," IGARSS 2000 (Hawaii).

D.A. Zaugg et al. "Ocean Surface and Landslide Probing with a Scanning Radar Altimeter," IGARSS 2000 (Hawaii).

B.T. Walkenhorst et al. "A Low cost, Radio Controlled Blimp as a Platform for Remote Sensing," IGARSS 2000 (Hawaii).

Liu et al. "Radiation of Printed Antennas wtih a Coplanar Waveguide Feed," IEEE Transactions on Antennas and Propagation, vol. 43, No. 10, Oct. 1995, pp. 1143–1148.

T. Metzler, "Microstrip Series Arrays," IEEE Transactions on Antennas and Propagation, vol. AP–29, No. 1, Jan. 1981, pp. 174–178.

A.G. Derneryd, "Linearly Polarized Microstrip Antennas," IEEE Transactions of Antennas and Propagation, Nov. 1976, pp. 846–851.

(List continued on next page.)

*Primary Examiner*—William A. Cuchlinski, Jr.
*Assistant Examiner*—Edward Pipala
(74) *Attorney, Agent, or Firm*—Workman, Nydegger & Seeley

(57) ABSTRACT

A method for dynamically defining traffic lanes in a traffic monitoring system is presented. A traffic system sensor detects vehicles passing within the field of view and process the data into an estimation of the position of each of the detected vehicles. The positions are defined and recorded for use in a probability density function estimation. The traffic lane positions are defined such that further detection of vehicles may be assigned to a particular traffic lane without requiring manual set-up and definition of the traffic lane boundaries. The traffic lane boundaries may change or migrate based upon modification of traffic paths due to construction, weather, lane re-assignments and the like.

21 Claims, 6 Drawing Sheets

OTHER PUBLICATIONS

J.D. Frederick et al. A Novel Single Card FMCW Radar Transceiver With On Board Monopulse Processing, no date.

Electronique Controle Mesure, LOREN Multi–Lane Microwave Detector, no date.

MS Sedco, Motion Sensors, TC26–B Microprocessor–Controlled Vehicle Detector, no date.

Accuwave LX–150 Microwave Detector, no date.

SmarTek Systems, The SAS–1 Passive Acoustic Vehicle Detector, no date.

Task Force L Final Report, Executive Summary, pp. 1–40, no date.

On Bench Photographs of Detectors, pp. 1–9, no date.

Transportation Operations Group—Sensors, pp. 1–13, no date.

RTMS General Information, pp. 1–6, no date.

RTMS Traffic Detector Primer, pp. 1–4, no date.

Automatic Lane Detection, no date.

SYSTEM AND METHOD FOR IDENTIFICATION OF TRAFFIC LANE POSITIONS

CROSS-REFERENCE TO RELATED APPLICATIONS

The present application is related to U.S. patent application Ser. No. 09/964,668 "Vehicle Traffic Sensor" by inventors David V. Arnold, Logan C. Harris, Michael A. Jensen, Thomas William Karlinsey, John B. Dougall, Jr., and Ryan Smith, filed concurrently herewith and incorporated by reference.

BACKGROUND OF THE INVENTION

1. The Field of the Invention

The present invention relates to roadway traffic monitoring, and more particularly, to determining the presence and location of vehicles traveling upon a multilane roadway.

2. The Relevant Technology

Vehicular traffic monitoring continues to be of great public interest since derived statistics are valuable for determination of present traffic planning and conditions as well as providing statistical data for facilitating more accurate and reliable urban planning. With growing populations, there is increasing need for current and accurate traffic statistics and information. Useful traffic information requires significant statistical gathering of traffic information and careful and accurate evaluation of that information. Additionally, the more accurate and comprehensive the information, such as vehicle density per lane of traffic, the more sophisticated the planning may become.

Roadway traffic surveillance has relied upon measuring devices, which have traditionally been embedded into the road, for both measuring traffic conditions and providing control to signaling mechanisms that regulate traffic flow. Various sensor technologies have been implemented, many of which have been "in-pavement" types. In-pavement sensors include, among others, induction loops which operate on magnetic principles. Induction loops, for example, are loops of wire which are embedded or cut into the pavement near the center of a pre-defined lane of vehicular traffic. The loop of wire is connected to an electrical circuit that registers a change in the inductance of the loops of wire when a large metallic object, such as a vehicle, passes over the loops of wire embedded in the pavement. The inductance change registers the presence of a vehicle or a count for the lane of traffic most closely associated with the location of the induction loops.

Induction loops and other in-pavement sensors are unreliable and exhibit a high failure rate due to significant mechanical stresses caused by the pavement forces and weather changes. Failures of loops are common and it has been estimated that at any one time, 20%–30% of all installed controlled intersection loops are non-responsive.

Furthermore, the cost to repair these devices can be greater than the original installation cost.

Installation and repair of in-pavement sensors also require significant resources to restrict and redirect traffic during excavation and replacement and also present a significant risk to public safety and inconvenience due to roadway lane closures which may continue for several hours or days. Interestingly, some of these technologies have been employed for over sixty years and continue to require the same amount of attention in installation, calibration, maintenance repair and replacement as they did several decades ago. This can be due to a number of factors from inferior product design or poor installation to post installation disruption or changing traffic flow patterns. Subsequently this technology can be extremely costly and inefficient to maintain as an integral component to an overall traffic plan.

To their credit, traffic control devices serve the interest of public safety, but in the event of a new installation, or maintenance repair, they act as a public nuisance, as repair crews are required to constrict or close multiple lanes of traffic for several hours to reconfigure a device or even worse, dig up the failed technology for replacement by closing one or more lanes for several days or weeks. Multiple lane closures are also unavoidable with embedded sensor devices that are currently available when lane reconfiguration or re-routing is employed. Embedded sensors that are no longer directly centered in a newly defined lane of traffic may miss vehicle detections or double counts a single vehicle. Such inaccuracies further frustrate the efficiency objectives of traffic management, planning, and control.

Such complications arise because inductive loop sensors are fixed location sensors, with the limitation of sensing only the traffic that is immediately over them. As traffic patterns are quite dynamic and lane travel can reconfigure based on stalled traffic, congestion, construction/work zones and weather, the inductive loop is limited in its ability to adapt to changing flow patterns and is not able to reconfigure without substantial modification to its physical placement.

Several non-embedded sensor technologies have been developed for traffic monitoring. These include radar-based sensors, ultrasound sensors, infrared sensors, and receive-only acoustic sensors. Each of these new sensory devices has specific benefits for traffic management, yet none of them can be reconfigured or adapted without the assistance of certified technicians. Such an on-site modification to the sensors may require traffic disruptions and may take several hours to several days for a single intersection reconfiguration.

Another traffic monitoring technology includes video imaging which utilizes intersection or roadside cameras to sense traffic based on recognizable automobile characteristics (e.g.; headlamps, bumper, windshield, etc.). In video traffic monitoring, a camera is manually configured to analyze a specific user-defined zone within the camera's view. The user-defined zone remains static and, under ideal conditions may only need to be reconfigured with major intersection redesign. As stated earlier, dynamic traffic patterns almost guarantee that traffic will operate outside the user defined zones, in which case, the cameras will not detect actual traffic migration. Furthermore, any movement in the camera from high wind to gradual movement in the camera or traffic lanes over time will affect the camera's ability to see traffic within its user-defined zone. In order to operate as designed, such technology requires manual configuration and reconfiguration.

Another known technology alluded to above includes acoustic sensors which operate as traffic listening devices. With an array of microphones built into the sensor, the acoustic device is able to detect traffic based on spatial processing changes in sound waves as the sensor receives them. Detection and traffic flow information are then assigned to the appropriate user-defined lane being monitored. This technology then forms a picture of the traffic based on the listening input, and analyzes it based on user assigned zones. Again, once the sensor is programmed, it will monitor traffic flow within the defined ranges only under ideal conditions.

Like an imaging camera, the acoustic sensor can hear traffic noise in changing traffic patterns, but it will only be monitored if it falls within the pre-assigned zone. Unable to reconfigure during changes in the traffic pattern, the acoustic sensor requires on-site manual reconfiguration in order to detect the new traffic flow pattern. In an acoustic sensor, microphone sensitivity is typically pre-set at a normal operating condition, and variations in weather conditions can force the noise to behave outside those pre-set ranges.

Yet another traffic sensor type is the radar sensor which transmits a low-power microwave signal from a source mounted off-road in a "side-fire" configuration or perpendicular angle transmitting generally perpendicular to the direction of traffic. In a sidefire configuration, a radar sensor is capable of discriminating between multiple lanes of traffic. The radar sensor detects traffic based on sensing the reflection of transmitted radar. The received signal is then processed and, much like acoustic sensing, detection and traffic flow information are then assigned to the appropriate user-defined lane being monitored. This technology then forms a picture of the traffic based on the input, and analyzes it based on user-assigned zones. Under ideal conditions, once these zones are manually set, they are monitored as the traffic flow operates within the pre-set zones. Consequently, any change in the traffic pattern outside those predefined zones needs to be manually reset in order to detect and monitor that zone.

As discussed above, several sensors may be employed to identify multiple lanes of vehicular traffic. While sensors may be positioned to detect passing traffic, the sensors must be configured and calibrated to recognize specific traffic paths or lanes. Consequently, such forms of detection sensors require manual configuration when the system is deployed and manual reconfiguration when traffic flow patterns change. Furthermore, temporary migration of traffic lanes, such as during, for example, a snow storm or construction re-routing, results in inaccurate detection and control. Without reconfiguration, the devices may continue to sense, but they may discard the actual flow pattern as peripheral noise, and only count the traffic that actually appears in their user-defined zones. The cost to configure and reconfigure devices can be considerable, and disruption to traffic is unavoidable under any circumstance. Furthermore, inaccurate counting of traffic flow can result in improper and even unsafe traffic control and inaccurate and inconvenient traffic reporting.

Thus, there exists a need for a method and system for configuring and continuously reconfiguring traffic sensors according to current traffic flow paths thereby enabling improved traffic control, traffic planning and enhanced public safety and convenience without requiring constant manual evaluation and intervention.

BRIEF SUMMARY OF THE INVENTION

A traffic monitoring system which employs a sensor for monitoring traffic conditions about a roadway or intersection is presented. As roadways exhibit traffic movement in various directions and across various lanes, the sensor detects vehicles passing through a field of view. The sensor data is input into a Fourier transform algorithm to convert from the time domain signal into the frequency domain. Each of the transform bins exhibits the respective energies with ranging being proportional to the frequency. A detection threshold discriminates between vehicles and other reflections.

A vehicle position is estimated as the bin in which the peak of the transform is located. A detection count is maintained for each bin and contributes to the probability density function estimation of vehicle position. The probability density function describes the probability that a vehicle will be located at any range. The peaks of the probability function represent the center of each lane and the valleys of the probability density function represent the lane boundaries. The boundaries are then represented with each lane being defined by multiple range bins with each range bin representing a slightly different position on the corresponding lane on the road. Traffic flow direction is also assigned to each lane based upon tracking of the transform phase while the vehicle is in the radar beam.

The present invention allows dynamic adjustment to lane boundaries. Vehicle positions change over time based upon lane migration due to weather, construction, lane re-assignment as well as other traffic disturbances. The lane update process starts after the initialization is done with the continuous output of the current probability density function at regular intervals. The update process is done by effectively weighting the past and present data and then adding them together.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
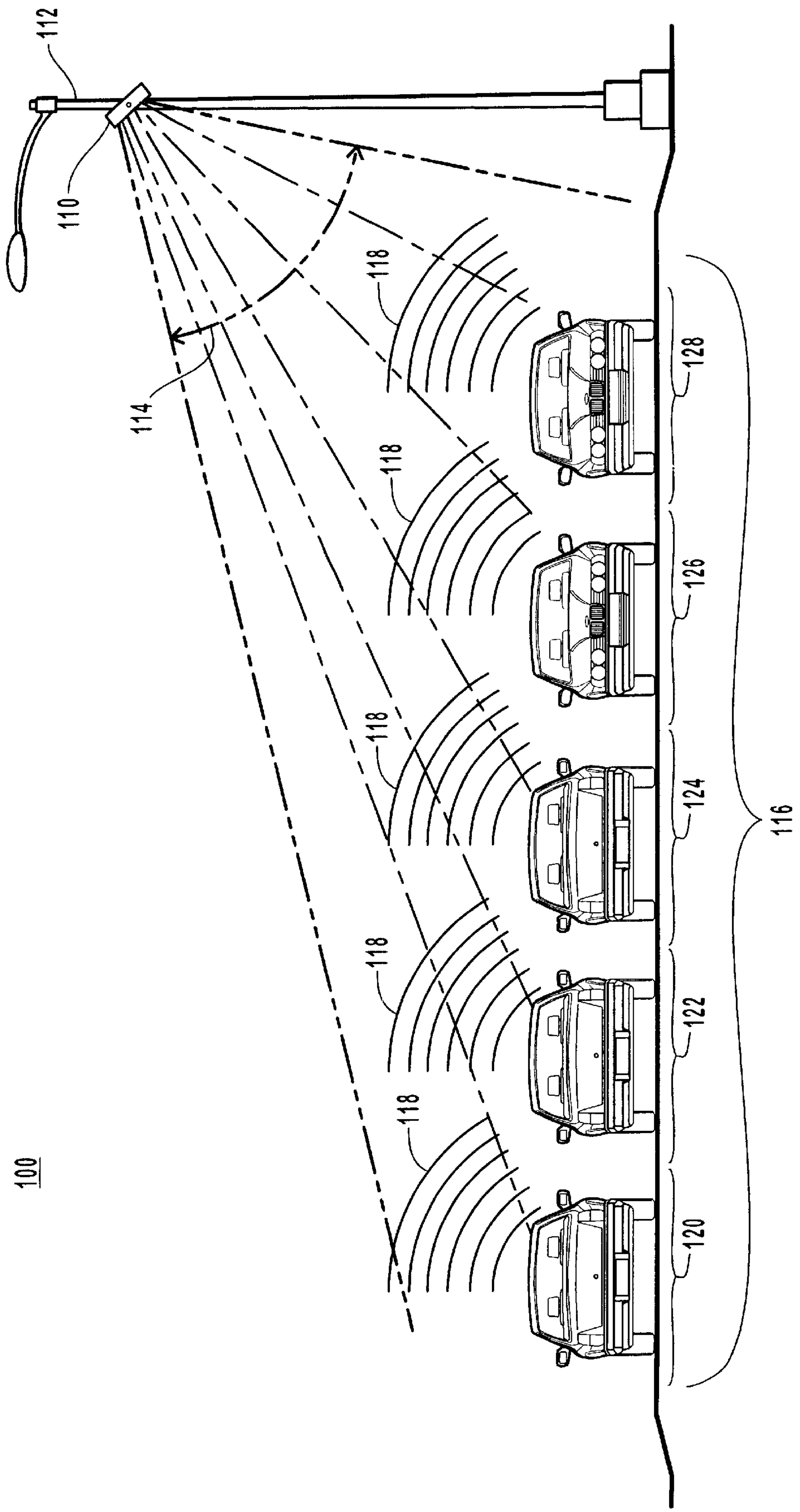
FIG. 1 illustrates a traffic monitoring system, in accordance with a preferred embodiment of the present invention.

FIG. 1 illustrates a traffic monitoring system 100 which provides a method and system for dynamically defining the position or location of traffic lanes to the traffic monitoring system such that counts of actual vehicles may be appropriately assigned to a traffic lane counter that is representative of actual vehicular traffic in a specific lane. In FIG. 1, traffic monitoring system 100 is depicted as being comprised of a sensor 110 mounted on a mast or pole 112 in a side-fire or perpendicular orientation to the direction of traffic. Sensor 110 transmits and receives an electromagnetic signal across a field of view 114. Preferably, the field of view 114 is sufficiently broad in angle so as to span the entire space of traffic lanes of concern. As further described below, sensor 110 transmits an electromagnetic wave of a known power level across the field of view 114. Subsequent to the transmission of an electromagnetic wave front across a roadway 116, reflected signals at a reflected power level are reflected, depicted as reflected waves 118 having a reflected power, back to a receiver within sensor 110. The reflected waves 118 are thereafter processed by sensor 110 to determine and dynamically define the respective roadway lanes, according to processing methods described below.

FIG. 1 further depicts roadway 116 as being comprised of a plurality of roadway lanes illustrated as lanes 120–128. The present example illustrates roadway 116 as having two traffic lanes in each direction with a center shared turn lane for use by either traffic direction.

Figure 2:
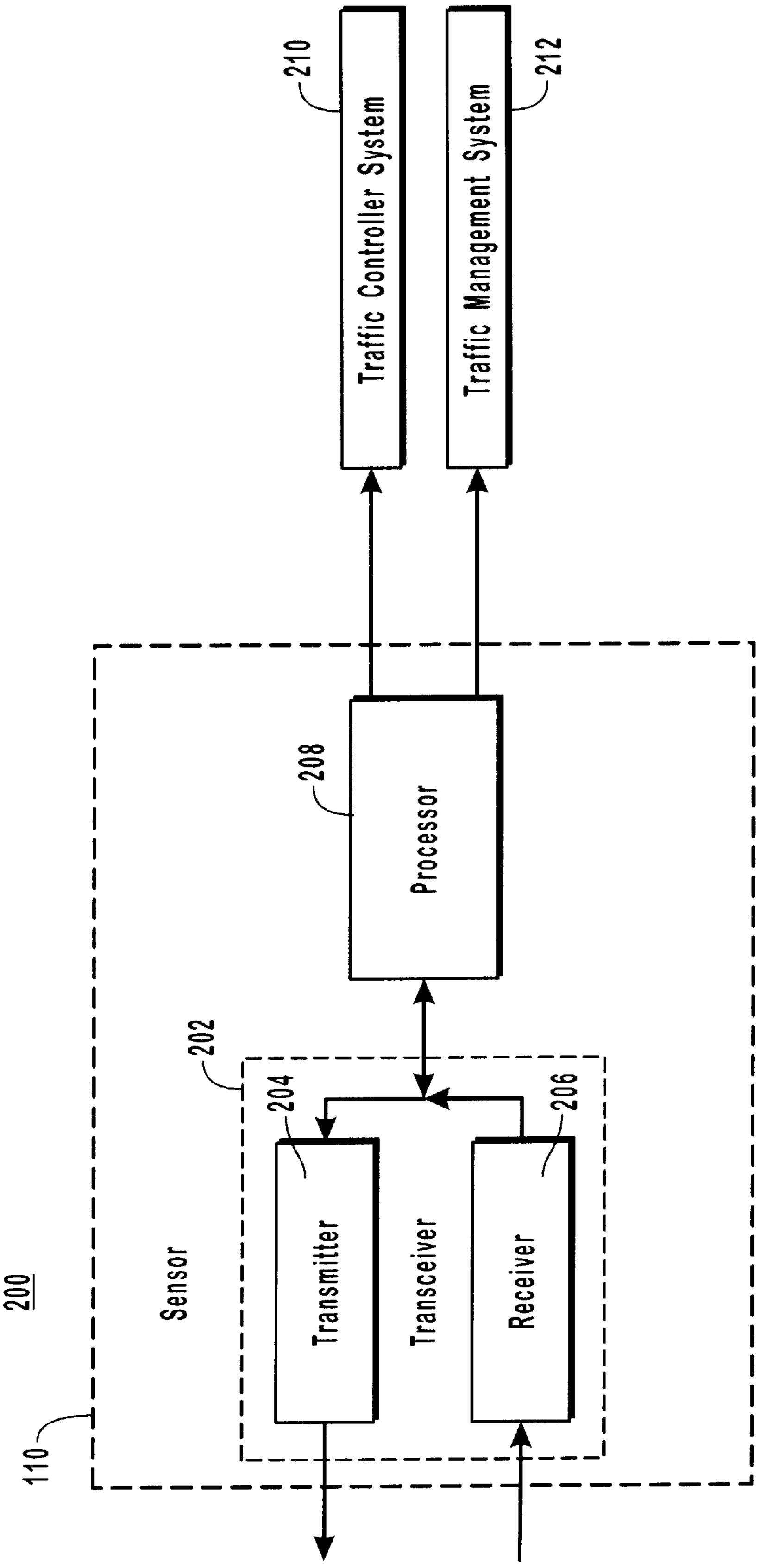
FIG. 2 is a block diagram of a sensor within the traffic system of the present invention.

FIG. 2 is a block diagram of the functional components of a traffic monitoring system, in accordance with the preferred embodiment of the present invention. Traffic monitoring system 200 is depicted as being comprised of a sensor 110 which is illustrated as being comprised of a transceiver 202 which is further comprised of a transmitter 204 and a receiver 206. Transmitter 204 transmits an electromagnetic signal of a known power level toward traffic lanes 120–128 (FIG. 1) across a field of view 114 (FIG. 1). Receiver 206 receives a reflected power corresponding to a portion of the electromagnetic signal as reflected from each of the vehicles passing therethrough. Transmitter 204 and receiver 206 operate in concert with processor 208 to transmit the electromagnetic signal of a known power and measure a reflected power corresponding to the presence of vehicles passing therethrough. Processor 208 makes the processed data available to other elements of a traffic monitoring system such as a traffic controller system 210 and traffic management system 212.

Figure 3:
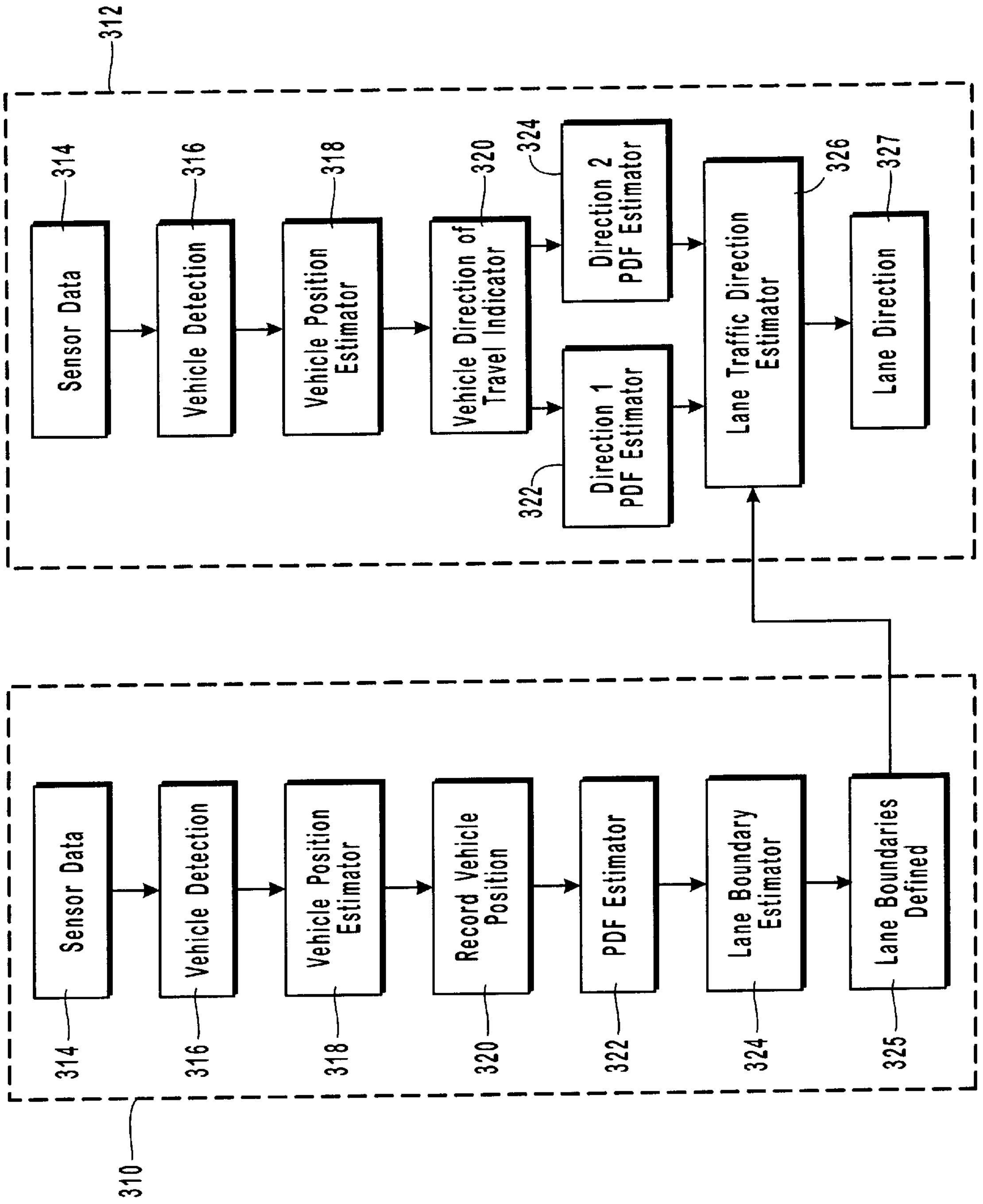
FIG. 3 is a flow-chart illustrating the steps for dynamically defining traffic lanes for use by sensor data within a traffic monitoring system.

FIG. 3 is a block diagram of the processing including the method for dynamically defining traffic lanes occurring within processor 208. FIG. 3 depicts a flow diagram 310 for defining the lane boundaries and a flow diagram 312 for further refining the processing by determining a lane direction. In flow diagram 310, sensor data 314 is received from transceiver 202 and is processed in a vehicle detection step 316 which determines the presence of a vehicle for contribution to the analysis of dynamic traffic lane definition. The detection algorithm starts by using the sensor data as input and then uses a Fourier transform to convert the time domain signal into the frequency domain. The magnitude of each Fourier transform bin shows the amount of energy the received signal contains at a particular frequency, and since range is proportional to frequency the Fourier transform magnitude represents the amount of energy received versus range. Vehicles reflect much more energy than the road or surrounding background and, therefore, their bright reflection shows up as a large spike in the magnitude of the Fourier transform. A detection threshold is set and when a Fourier transform magnitude exceeds the threshold, a vehicle detection occurs.

Upon the detection of the presence of a vehicle, a vehicle's position is estimated in a step 318 as calculated from the sensor data received above. The vehicle's position is estimated as the bin in which the peak of the Fourier transform is found. The vehicle's position is recorded in a step 320 with the vehicle's position measurement being recorded and contributing to the vehicle position probability density function (PDF) as estimated in the step 322. The vehicle position PDF represents the probability that a vehicle will be located at any range and reveals the lane locations on the road. Upon the measurement of a selectable quantity of vehicles, the probability density function estimates a vehicle's position in a step 324 and facilitates the definition of lane boundaries in a step 325 within the system.

The lane boundary estimation of the present invention uses the vehicle position PDF to estimate the location of traffic lane boundaries. The peaks of the PDF represent the center of each lane and the low spots (or valleys) of the PDF represent the lane boundaries (or regions where cars don't drive). The lane boundaries are set to be the low spots (or valleys) between peaks. There is not necessarily a valley before the first peak or after the last peak, therefore, a decision rule must be applied to set the two outside boundaries. Because of experience with the system a fixed distance from the outside peaks was typically used for the outside boundaries. These outside boundaries represent the edge of the road. Each range bin represents a slightly different position on the corresponding lane on the road, and each defined lane is comprised of multiple range bins.

In flow chart 312, lane directionality is determined by utilizing sensor data. 314 and further employing vehicle detection step 316 and vehicle position estimating step 318. In a step 320, the vehicle direction of travel is found by generating a first direction PDF estimation in a step 322 and a second direction PDF estimator in a step 324. A separate PDF for each direction of traffic flow is determined and then each of these PDFs is used, in conjunction with the lane boundary information in a step 325 to assign a traffic flow direction to each lane in a step 326. To assign traffic flow direction to each lane, the information about the vehicle position (from the vehicle position estimator) and the raw data are used.

To determine direction of travel automatically, the radar is preferably not mounted precisely perpendicular to the road. It is mounted off perpendicular, pointing slightly into the direction of travel of the nearest lane (to the left if standing behind the radar facing the road) by a few degrees. The vehicle direction of travel is determined by tracking the Fourier transform phase while the vehicle is in the radar beam. Many measurements are made while the car is in the radar beam. After the car has left the beam, the consecutive phase measurements are phase unwrapped to produce a curve that is approximately quadratic in shape and shows evidence of vehicle travel direction.

Figure 4:
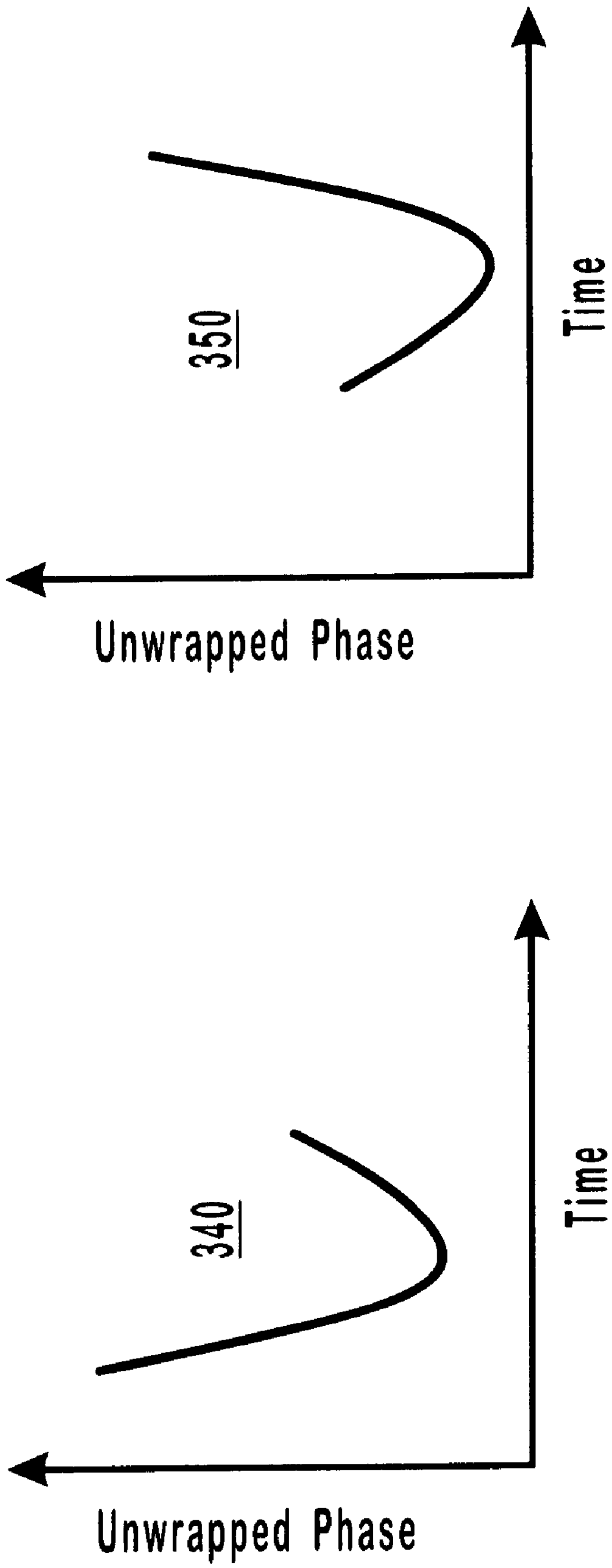
FIG. 4 illustrates the curves associated with angular viewing of traffic with the associated differentiation of traffic direction.

A vehicle entering the radar beam from the left will produce a curve similar to curve 340 of FIG. 4 with the left end of the curve being higher than the right end. This occurs because with the radar turned a few degrees the vehicle spends more time, while in the radar beam, approaching the radar sensor than leaving the sensor. Likewise, a vehicle entering from the right will produce a curve as in curve 350 of FIG. 4 with the right end of the curve being higher than the left. Once the direction of travel is known, the vehicle position and lane boundaries are used to determine which lane the vehicle is in. The direction of traffic flow can then be estimated by using the direction PDF estimates to determine which direction of flow is most probable in each lane.

Figure 5:
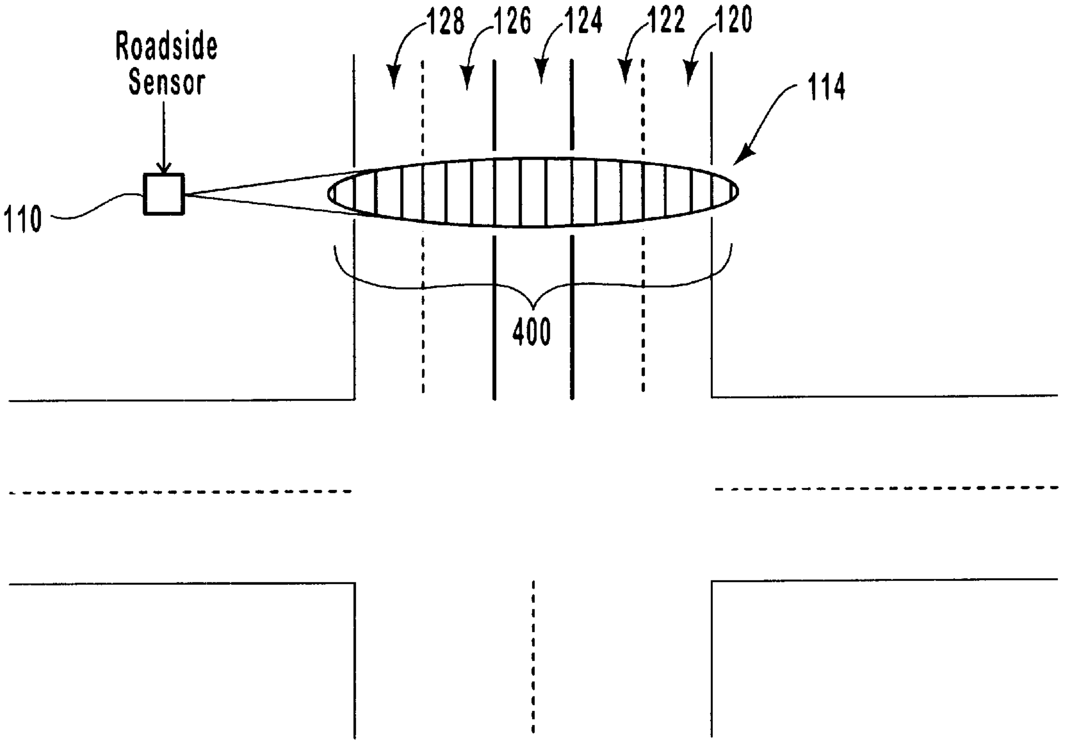
FIG. 5 is a simplified diagram of a sensor and roadway configuration, in accordance with a preferred embodiment of the present invention.

FIG. 5 depicts a side-fired deployment of a sensor 110, in accordance with the present invention. While sensors may be deployed in a number of setups, one preferred implementation is a side fire or perpendicular configuration. In FIG. 5, a roadside sensor 110 is depicted as having a field of view 114 spread across multiple lanes of traffic. In the preferred embodiment, the field of view is partitioned into a plurality of bins 400, each of which represents a distance or range such that a lane may be comprised of a plurality of bins which provide us a smaller and more improved granularity of statistical bins into which specific position may be allocated.

Figure 6:
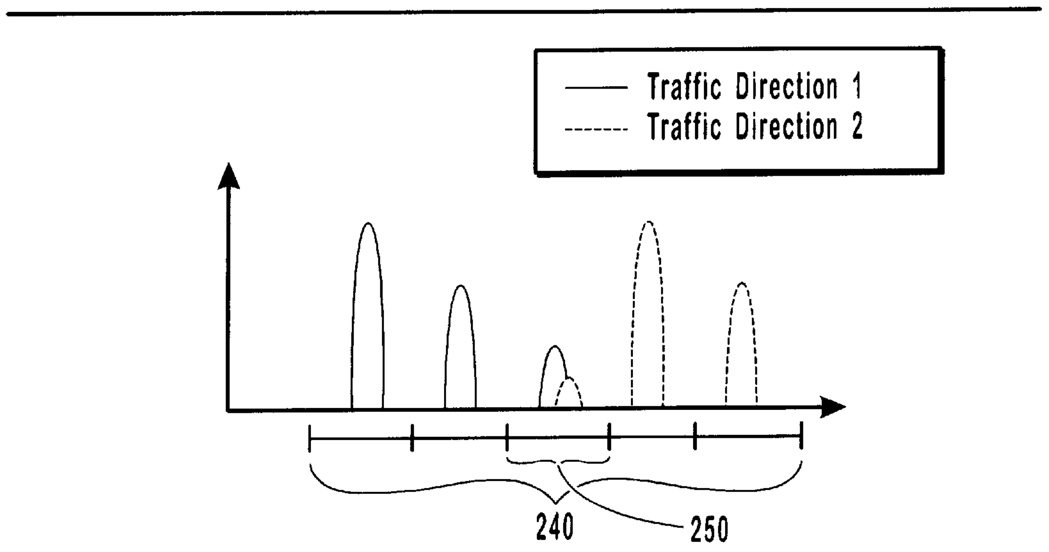
FIG. 6 illustrates a histogram of the vehicle locations for use in dynamically defining traffic lanes, in accordance with the preferred embodiment of the present invention.

FIG. 6 depicts a statistical plotting or histogram of the positions of the exemplary data, in accordance with the processing methods of the present invention. By way of example, range bins may be partitioned into widths of approximately two meters, while traffic lanes are approximately four meters in width. Such a granularity dictates that statistical lane information may be derived from a plurality of bins. As recalled, a sensor's transmitted signal reflects off a vehicle back to the sensor when a vehicle passes through the field of view.

After processing the received signal, the signal reflected off the vehicles is assigned to a bin having the corresponding reflected signal parameters and shows up as an energy measurement in the range bin representing the vehicle's position. The number of vehicles in each bin is counted with the count incremented when an additional vehicle is detected the count and assigned to that bin. When a bin count is incremented, it increases the probability of a car being in that position and after many vehicle positions are recorded, a histogram of the bin count represents a PDF of vehicle position on the road. The histogram of position measurements identifies where vehicles are most probable to be and where the traffic lanes on the roadway should be defined. In the present figure, lanes 240 derive their specific lane positions by setting the lane boundaries between the peaks according to detection theory.

Alternative ways of automatically assigning lane boundaries may be used but are simplifications or subsets of using PDF estimates and decision theory to set the boundaries. For a method to automatically assign lane boundaries it must have a period of training where it gathers information about vehicle position on the road and this collection of position information over time is more or less the histogram explained above. Decision theory will be used in determining lane boundaries and can vary according to desired performance. FIG. 6 further depicts two separate peaks located within lane 250. Such a multiplicity denotes that lane 250 is used by vehicles traveling in both directions, mainly a turning lane located between two pairs of lanes facilitating vehicular traffic in opposite directions.

The preferred embodiment of the present invention employs statistical processing in order to determine and dynamically track the placement of lanes. While the present invention depicts a preferred statistical implementation, those of skill in the art appreciate that other statistical approaches may also be employed for dynamically defining traffic lanes. In the present embodiment, X1 represents a random variable describing the position of vehicles traveling in lane 1. Similarly, X2, X3, . . . , and XN represent the random variables describing the position of vehicles traveling in lanes 2 through N. Let $P_{X1}$ (x) be the probability distribution of X1, where x represents the vehicle position and can take on any value in the range of position measurements available to the sensor. The random variable that is available for estimation by a traffic sensor is the sum of the random variables for all lanes visible to the sensor. Let Y represent this random variable, $$Y=\text{Sum}(X\mathbf{1}, X\mathbf{2}, \ldots XN)$$

Figure 7:
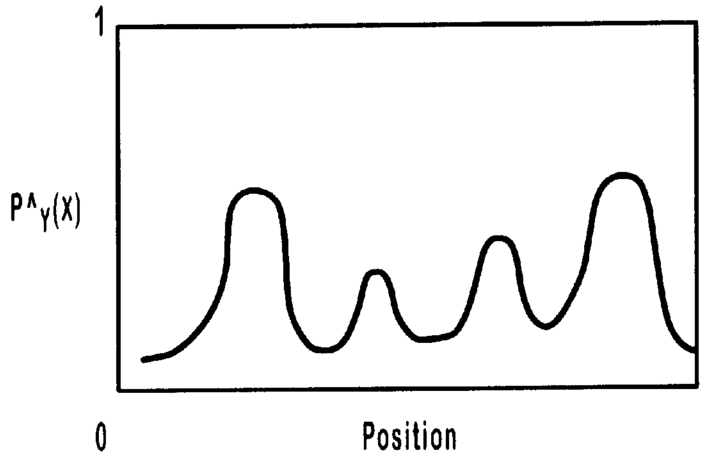
FIG. 7 illustrates the typical distribution of a traffic sensor's estimation of the probability density function, in accordance with the present invention.

FIG. 7 depicts a typical distribution of an estimate of PDF of Y denoted by $\hat{P}_Y(x)$. Based on the estimated PDF of Y, an estimate can be derived for the PDFs of X1, through XN, that will be denoted by $\hat{P}_{X1}(x)$, through $\hat{P}_{XN}(x)$. For example, one exemplary method of doing this would be to combine several Gaussian distributions that are weighted and positioned proportional to the height and location of the peaks in $\hat{P}_Y(x)$. If direction of travel information is available from the sensor, then this information can be used to distinguish sensor data from lanes of opposing direction thus simplifying the individual lane PDF estimation problem.

The estimated PDFs $\hat{P}_{X1}(x)$, through $\hat{P}_{XN}(X)$ can be used to calculate lane boundaries. One approach in calculating the lane boundaries is to use classic decision theory. By way of example and not limitation, an approach that minimizes average cost between two lanes is presented. In this approach, the PDF of each lane is compared to the probability that a vehicle is in each lane and to the cost of misclassification. This analysis produces the lane boundaries. Using these boundaries, the sensor's vehicle position measurement can be converted to a lane classification. For example, if the lane boundary is set at 10 then the vehicle will be said to be in lane 1 if x<10 and will be said to be in lane 2 if x>10.

The following discussion uses the Bayes Detector to determine lane boundaries. The Bayes Detector will minimize the average cost of misclassification. Let $C_{21}$ be the cost associated with classifying a vehicle in lane 2 when it is really in lane 1. Similarly, $C_{12}$ is the cost of classifying a vehicle in lane 1 when it is in lane 2. We assume there is no cost for a vehicle correctly classified. The Bayes Detector will give the minimum average cost and states that for a vehicle in lane 1:

$$\frac{P_{X1}(x)}{P_{X2}(x)} > \frac{p_o C_{21}}{q_o C_{12}}.$$

Where $p_o$ is the probability that the vehicle is in lane 1 and $q_o$ is the probability that the vehicle is in lane 2. Values for $p_o$ and $q_o$ are based solely on past traffic information and not the current sensor measurement. For an initial lane boundary estimation, $p_o$ and $q_o$ could be estimated from the original estimated PDF, $\hat{P}_Y(x)$, or a probability could be assumed. For example, if we know there is equal traffic in each lane then $p_o$ and $q_o$ should be set to 0.5. If we assume 80% of the traffic is in lane 1 then $p_o$ should be set to 0.8 and $q_o$ should be set to 0.2. After initial lane boundaries are assigned, vehicle counts in each lane can be used to estimate $p_o$, and $q_o$.

If lane boundaries corresponding to the physical boundaries of the lanes are desired, then the cost of misclassification for each lane should be set equal and the probability of a vehicle being in each lane should also be set equal. Namely, $C_{21}=C_{12}=1$ and $p_o=q_o=0.5$.

By way of example, the lane boundary is the value of x where $$P_{X1}(x) = \frac{p_o C_{21}}{q_o C_{12}} P_{X2}(x).$$

To expand this problem to an arbitrary number of lanes, the boundary between two adjacent lanes can be calculated without considering the other lanes. For example, consider a roadway with three lanes. The boundary between lane 1 and lane 2 can be found using the statistical method described above (ignoring lane 3). The boundary between lane 2 and lane 3 can also be found using the same method (ignoring lane 1). The outside boundary of the outside lanes should be set based on the PDF of that lane alone. For example, the outside lane boundary can be set such that the probability a vehicle will lie outside the boundary is below a designated percentage.

If vehicle position statistics change over time due to weather, road construction, or other disturbances the lane position algorithms have the ability to update lane boundaries. One example would be to have the current set of statistics averaged into the past statistics with a small weight given to older position statistics and greater weight to more recent statistics. Thus, if conditions change the overall statistics will change to reflect the current situation in an amount of time dictated by how much the current set of data is weighted.

Figure 8:
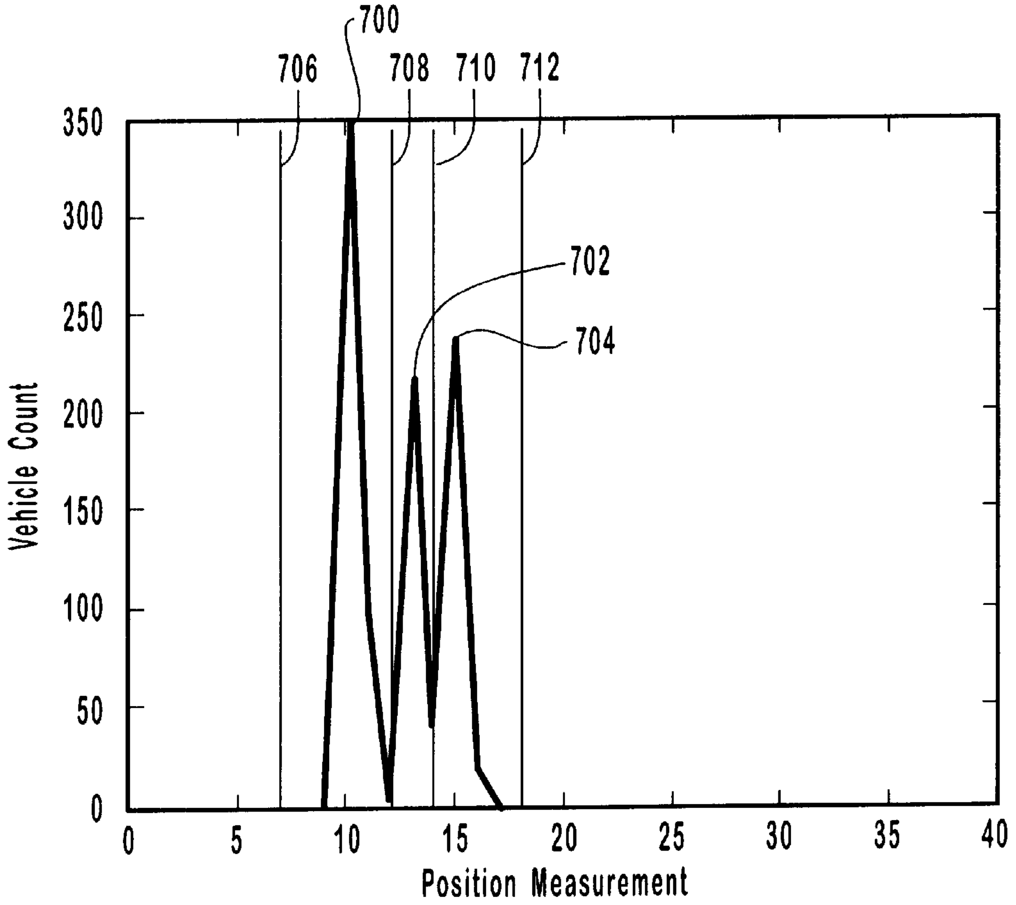
FIG. 8 illustrates an actual plot of a histogram of vehicle position measurement data for a three lane road, in accordance with the present invention.

FIG. 8 illustrates a histogram of vehicle position measurement from data collected with the present invention. Each of the three peaks, 700, 702 and 704, represents the center of each calculated lane depicting a concentration of detected vehicles. Centered about probability concentration peaks 700, 702 and 704 are lane boundaries 706–712.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a traffic monitoring system having a sensor, a method for defining traffic lanes, comprising the steps of:

a. for a selectable plurality of vehicles,
 i. detecting each of said selectable plurality of vehicles present within a field of view of said sensor;
 ii. estimating a position of said each of said selectable plurality of vehicles;
 iii. recording said position of said each of said selectable plurality of vehicles;

b. generating a probability density function estimation from each of said position of said each of said selectable plurality of vehicles; and c. defining said traffic lanes within said traffic monitoring system from said probability density function estimation.

2. The method as recited in claim 1 wherein said detecting each of said selectable plurality of vehicles step comprises the steps of:

a. transmitting from said sensor an electromagnetic signal of a known power toward said traffic lanes; and b. measuring at said sensor a reflected power corresponding to a portion of said electromagnetic signal as reflected from each of said selectable plurality of vehicles.

3. The method as recited in claim 1 wherein said estimating a position step comprises the step of:

a. partitioning said field of view of said sensor into range bins wherein each of said traffic lanes includes a plurality of range bins each having a received power range associated therewith; and b. assigning said position of said each of said selectable plurality of vehicles to a corresponding one of said range bins when said reflected power from each of said selectable plurality of vehicles corresponds with said reflected power range of said corresponding one of said plurality of range bins.

4. The method as recited in claim 3 wherein said generating a probability density function comprises the step of:

a. generating a histogram of said positions within said plurality of range bins.

5. The method as recited in claim 4 wherein said defining said traffic lanes comprises the steps of:

a. identifying probability peaks on said histogram of said positions; and b. defining boundaries around each of said probability peaks, said boundaries about each of said probability peaks representing one of said traffic lanes therebetween.

6. The method as recited in claim 1 wherein said generating a probability density function estimation further comprises the step of:

a. weighting for more statistical significance more recent ones of each of said positions of each of said selectable plurality of vehicles than stale ones of each of said positions.

7. The method as recited in claim 1 further comprising the steps of:

a. assigning a traffic flow direction to said position of said each of said selectable plurality of vehicles;

b. recording said traffic flow direction to said position of said each of said selectable plurality of vehicles;

c. generating probability density function estimations for each of said traffic flow directions; and d. assigning said traffic flow directions to said traffic lanes.

8. A sensor for defining traffic lanes in a traffic monitoring system, comprising:

a. a transceiver for detecting each of a selectable plurality of vehicles present within a field of view of said transceiver; and b. a processor including executable instructions for performing the steps of:
 i. estimating a position of said each of said selectable plurality of vehicles;
 ii. recording said position of said each of said selectable plurality of vehicles; for a selectable plurality of vehicles
 iii. generating a probability density function estimation from each of said position of said each of said selectable plurality of vehicles; and
 iv. defining said traffic lanes within said traffic monitoring system from said probability density function estimation.

9. The sensor as recited in claim 8 wherein said transceiver comprises:

a. a transmitter for transmitting an electromagnetic signal of a known power toward said traffic lanes; and b. a receiver for receiving a reflected power corresponding to a portion of said electromagnetic signal as reflected from each of said selectable plurality of vehicles.

10. The sensor as recited in claim 8 wherein said processor further includes executable instructions for performing the steps of:

a. partitioning said field of view of said sensor into range bins wherein each of said traffic lanes includes a plurality of range bins each having a received power range associated therewith; and b. assigning said position of said each of said selectable plurality of vehicles to a corresponding one of said range bins when said received power from each of said selectable plurality of vehicles corresponds with said received power range of said corresponding one of said plurality of range bins.

11. The sensor as recited in claim 10 wherein said processor further includes executable instructions for performing the step of:

a. generating a histogram of said positions within said plurality of range bins.

12. The sensor as recited in claim 11 wherein said executable instructions for defining said traffic lanes further comprises executable instructions for performing the steps of:

a. identifying probability peaks on said histogram of said positions; and b. defining boundaries around each of said probability peaks, said boundaries about each of said probability peaks representing one of said traffic lanes therebetween.

13. The sensor as recited in claim 8 wherein said executable instructions for performing the steps of generating a probability density function estimation further comprises executable instructions for performing the step of:

a. weighting for more statistical significance more recent ones of each of said positions of each of said selectable plurality of vehicles than stale ones of each of said positions.

14. The sensor as recited in claim 8 further comprising executable instructions for performing the steps of:

a. assigning a traffic flow direction to said position of said each of said selectable plurality of vehicles;

b. recording said traffic flow direction to said position of said each of said selectable plurality of vehicles;

c. generating probability density function estimations for each of said traffic flow directions; and d. assigning said traffic flow directions to said traffic lanes.

15. In a traffic monitoring sensor, including a transceiver and a processor, a computer-readable medium having computer executable instructions thereon for execution by said processor for performing the steps of:

a. for a selectable plurality of vehicles, i. detecting each of said selectable plurality of vehicles present within a field of view of said sensor;

ii. estimating a position of said each of said selectable plurality of vehicles;

iii. recording said position of said each of said selectable plurality of vehicles;

b. generating a probability density function estimation from each of said position of said each of said selectable plurality of vehicles; and c. defining said traffic lanes within said traffic monitoring system from said probability density function estimation.

16. The computer-readable medium as recited in claim 15 wherein said computer executable instructions for performing the steps of detecting each of said selectable plurality of vehicles comprises computer executable instructions for performing the steps of:

a. transmitting from said sensor an electromagnetic signal of a known power toward said traffic lanes; and b. measuring at said sensor a reflected power corresponding to a portion of said electromagnetic signal as reflected from each of said selectable plurality of vehicles.

17. The computer-readable medium as recited in claim 15 wherein said computer executable instructions for performing the steps of estimating a position step comprise computer executable instructions for performing the steps of:

a. partitioning said field of view of said sensor into range bins wherein each of said traffic lanes includes a plurality of range bins each having a received power range associated therewith; and b. assigning said position of said each of said selectable plurality of vehicles to a corresponding one of said range bins when said reflected power from each of said selectable plurality of vehicles corresponds with said reflected power range of said corresponding one of said plurality of range bins.

18. The computer-readable medium as recited in claim 17 wherein said computer executable instructions for performing the step of generating a probability density function comprises computer executable instructions for performing the step of:

a. generating a histogram of said positions within said plurality of range bins.

19. The computer-readable medium as recited in claim 18 wherein said computer executable instructions for performing the step of defining said traffic lanes comprises computer executable instructions for performing the steps of:

a. identifying probability peaks on said histogram of said positions; and b. defining boundaries around each of said probability peaks, said boundaries about each of said probability peaks representing one of said traffic lanes therebetween.

20. The computer-readable medium as recited in claim 15 wherein said computer executable instructions for performing the step of generating a probability density function estimation further comprises computer executable instructions for performing the step of:

a. weighting for more statistical significance more recent ones of each of said positions of each of said selectable plurality of vehicles than stale ones of each of said positions.

21. The computer-readable medium as recited in claim 15 wherein said computer executable instructions further comprise computer executable instructions for performing the steps of:

a. assigning a traffic flow direction to said position of said each of said selectable plurality of vehicles;

b. recording said traffic flow direction to said position of said each of said selectable plurality of vehicles;

c. generating probability density function estimations for each of said traffic flow directions; and d. assigning said traffic flow directions to said traffic lanes.

* * * * *